Nov. 19, 1929.  J. FRIEDMAN  1,736,526
SUPPORT FOR ARTIFICIAL FLOWERS
Filed Nov. 18, 1927

INVENTOR
Joseph Friedman
BY
ATTORNEY

Patented Nov. 19, 1929

1,736,526

UNITED STATES PATENT OFFICE

JOSEPH FRIEDMAN, OF BROOKLYN, NEW YORK

SUPPORT FOR ARTIFICIAL FLOWERS

Application filed November 18, 1927. Serial No. 234,091.

This invention relates to supports for artificial flowers and is particularly adapted to support flowers made of glass, jade, coral or the like for ornamental purposes and provided with metallic stems or stems of other material which are comparatively rigid.

My invention contemplates the provision of cooperating threaded members one secured to the lower ends of the flower stems and the other to the receptacle for the flowers whereby the entire bunch or bouquet of flowers may be readily and firmly secured to the holder, or removed therefrom, for the purposes of packing, shipping and replacement. The various objects of my invention will be clear from the description which follows, and from the drawings, in which, Fig. 1 is a front view of a flower holder partly in section showing the flowers secured in place.

In the practical embodiment of my invention which I have illustrated herein, I provide a receptacle as 10 into which the lower ends of the flower stems may be inserted. Said receptacle is shown in the form of a bowl, though it will be understood that any suitable base or support may be used instead if desired, as for instance a block made of glass, metal or the like, having a proper opening for the reception of the stems. The holder 10 is designed to be filled in the customary manner with filling material such as the excelsior 11 or the like, the upper part of the bowl being covered in the usual manner with imitation moss or grass 12 arranged on, and designed to conceal the filling material, and to present an imitation of the natural surroundings of the flowers.

Figure 1:
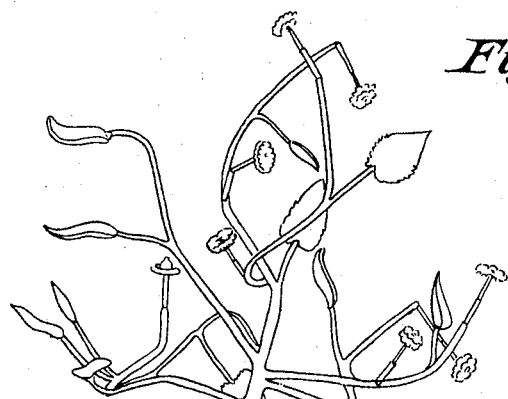

In the form shown in Fig. 1, the stems of the flowers are preferably made of wire, wrapped with suitable colored fabric, the ends of the stems being spread apart so that a suitable screw as 13 may be arranged between and inside of the stems. In order to secure the screw in place, a number of turns of thin wire 14 may be used whereby the screw 13 and the stems 19 may be moved or rotated as a unit. Near the central portion of the bottom 15 of the holder, is arranged the internally threaded member 16 into which the lower end of the screw 13 may be screwed for the purpose of supporting the flowers securely in place. The member 16 may be soldered to the bottom 15 if desired, or secured thereto in any other suitable manner as is well known in the art.

Figure 3:
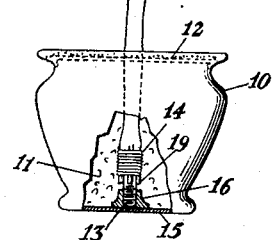
Fig. 3 is a horizontal section of the same.
Figure 2:
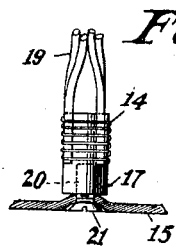
Fig. 2 is a fragmentary front view of the lower ends of the flower stems and of part of the holder bottom showing a modified form of securing means.

In the forms shown in Figs. 2 and 3, there may be substituted for the screw 13, a preferably cylindrical member 17 provided with longitudinal grooves as 18 if desired, in which the stems 19 may be arranged. A number of turns of thin wire 14 may be used to prevent the stems 19 from leaving the grooves 18 or from being otherwise separated from the member 17. A threaded opening 20 is provided in the lower end of the member 17 into which opening the screw 21 passing through the bottom 15 of the holder, may be inserted for the purpose of firmly fastening down said member.

It will be understood, however, that the grooves 18 may be omitted if desired, and the stems held in place on the outer surface of the member 17 by means of the wire 14 only, or that, if desired, the stems 19 may be soldered to the outer surface of the member 17 without using the wire 14.

Figure 4:
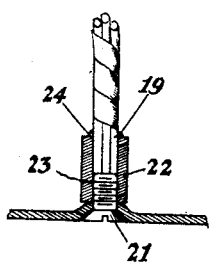
Fig. 4 is a vertical fragmentary section of another modified form of support for the flower stems.

Referring now to Fig. 4, I have there shown a member 22 similar to the member 17 but having an internally threaded opening 23 into the upper part of which the stems 19 may be inserted. Said stems are bared of their coverings for a sufficient distance to allow the soldering thereof as by means of the solder 24 to hold said stems to the member 22. The screw 21 is designed to enter and engage the internally threaded opening of the member 23 so that the parts may be firmly but removably secured in place.

Figure 6:
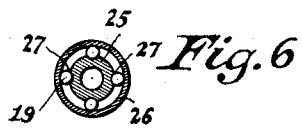
Fig. 6 is a horizontal section of the same.
Figure 5:
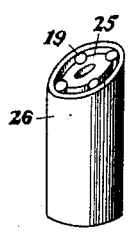
Fig. 5 is a perspective view of a similar modification.

In Figs. 5 and 6, I have shown a modified form of supporting means consisting of a pair of concentrically arranged cylinders 25 and 26. The inside diameter of the cylinder 26 exceeds the outside diameter of the cylinder 25 by an amount substantially equal to the radial distance by which the stems 19 project past the outer surface of the member 25. In other words, after the stems 19 are arranged in place in contact with the cylinder 25, the outer cylinder 26 may be forced axially over the stems for frictionally holding them in place. If desired, suitable grooves as 27 arranged longitudinally of the cylinder 25 may be made therein for the purpose of preventing displacement of the stems 19 relatively thereto. The inner cylinder 25 is internally threaded for the reception of the screw 21 whereby the parts may be properly held in secured position.

It will be seen that I have provided simple, inexpensive and efficient means for securing the ends of artificial flowers in place, in a holder therefor in such a manner that the flowers may be removed from the holder if desired, or quickly replaced therein, and that the flowers are thereby firmly supported against possible displacement which might tend to allow their injury.

Since various changes may be made in the preferred construction illustrated herein, I do not intend to limit myself to the specific structure shown and described, but intend to secure to myself all equivalent structures falling within the spirit of this invention and the scope of the appended claims.

I claim:

1. In a holder for artificial flowers, the combination with flower stems consisting of a bundle of wrapped wires, exposed at the lower ends thereof, of means for removably supporting the flowers comprising cooperating threaded elements one of said elements being associated with the holder and the other of said elements being secured to the lower ends of the wires.

2. In a holder for artificial flowers having wire stems, the combination with the lower ends of the wire stems of the flowers, of a threaded element, means for securing the threaded elements to the wire stems, a cooperating threaded element on the holder, and means for securing the cooperating threaded element to the holder, whereby the stems may be secured to and removed from the holder.

3. A holder for artificial flowers comprising a receptacle adapted to receive the stems of the flowers with the upper parts of the stems and the flowers projecting above the top thereof, a threaded member secured to and projecting upwardly from the bottom of said receptacle, a second threaded member secured to said stems and adapted to engage the first-mentioned member, and a cover inserted into said receptacle simulating the natural surroundings of the flowers, said stems passing through said cover.

4. A holder for artificial flowers having comparatively rigid wire stems grouped together comprising a receptacle member adapted to have said stems inserted thereinto, a threaded element secured to said member and a second threaded element secured to the lower ends of said stems and adapted to engage the first-mentioned threaded element.

5. In a holder for artificial flowers, the combination with wire flower stems grouped together of a threaded element secured to said stems, and a second threaded element secured to said holder and adapted to removably engage said first mentioned threaded element.

6. In a holder for artificial flowers, a receptacle member adapted to have the stems of the flowers passed thereinto, a threaded element adapted to be operatively connected to the stems secured to said member near the central part thereof and an apertured cover for the member concealing the interior of the member, allowing the stems to pass through the aperture thereof and simulating the natural surroundings of the flowers.

7. The combination with artificial flowers having comparatively rigid stems, of a threaded screw inserted for part of its length between the lower ends of said stems and projecting downwardly therefrom, a number of turns of wire passing about said stems for fastening the stems about said screw, a receptacle for the stems, and an internally threaded member, adapted to have said screw screwed thereinto, secured to said receptacle.

JOSEPH FRIEDMAN.